United States Patent

Kuromusha et al.

(10) Patent No.: US 6,175,828 B1
(45) Date of Patent: *Jan. 16, 2001

(54) RETRIEVAL APPARATUS

(75) Inventors: Kenichi Kuromusha, Tenri; Ikuo Keshi, Nara; Hiroshi Ikeuchi, Tenri, all of (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,781

(22) Filed: Jan. 5, 1998

(30) Foreign Application Priority Data

Feb. 28, 1997 (JP) .................................. 9-045039

(51) Int. Cl.⁷ .................... G06F 9/00; G06F 6/00
(52) U.S. Cl. ..................... 707/3; 707/103; 707/1
(58) Field of Search ............................ 707/1–224

(56) References Cited

U.S. PATENT DOCUMENTS

| | | | | |
|---|---|---|---|---|
| 5,317,507 | * | 5/1994 | Gallant | 707/532 |
| 5,592,568 | * | 1/1997 | Wilcox et al. | 382/218 |
| 5,604,839 | * | 2/1997 | Acero et al. | 704/234 |
| 5,619,709 | * | 4/1997 | Caid et al. | 707/532 |
| 5,825,855 | * | 10/1998 | Astarbadi | 379/67.1 |
| 5,832,474 | * | 11/1998 | Lopresti et al. | 707/2 |
| 5,862,211 | * | 1/1999 | Roush | 379/309 |
| 5,893,095 | * | 4/1999 | Jain et al. | 707/6 |

FOREIGN PATENT DOCUMENTS

| | | |
|---|---|---|
| 0 750 266 | 12/1996 | (EP) . |
| 6-195388 | 7/1994 | (JP) . |
| 6-208588 | 7/1994 | (JP) . |

OTHER PUBLICATIONS

Salton, Gerard et al., "Extended Boolean Information Retrieval", Communications of the Association for Computing Machinery, vol. 26, No. 12, Dec. 1983, pp. 1022–1036.
Keshi, Ikuo et al., "Associative Image Retrieval Using Knowledge in Encyclopedia Text", Systems and Computers in Japan, vol. 27, No. 12, 1996, pp. 53–62.
"Associative Retrieval of Very Large Document Databases", Keshi et al, Technical Report of IEICE. AI92–99 (Jan. 1993) The Institute of Electronics, Information and Communication Engineers.

* cited by examiner

Primary Examiner—Thomas G. Black
Assistant Examiner—John G. Mills
(74) Attorney, Agent, or Firm—Nixon & Vanderhye P.C.

(57) ABSTRACT

A retrieval apparatus is capable of simultaneously executing keyword retrieval and semantic retrieval of information. The retrieval apparatus includes an input for inputting a request-text for retrieval, a word dictionary for storing words together with corresponding word vectors in n-vector space, a database containing a plurality of data including at least a word, word extracting structure for extracting a word in the request-text by using the word dictionary, vector generating structure for generating a request-text vector from the request-text by using the word dictionary and the word extracting structure, vector retrieving structure for determining semantic similarity of each data vector to the request-text vector, keyword retrieving structure for searching data containing a word corresponding to that in the request-text by using the word extracting structure and extended retrieving structure for retrieving data adapted to the request-text on the basis of the semantic similarity of the data vector to the request-text vector and the number of the words commonly included in the data and the request-text.

9 Claims, 2 Drawing Sheets

| WORD | NUMBER OF DATA INCLUDING THE WORD |
|---|---|
| TOWN | 4, 43, 54, 55, 67, 76, 80, 84, 110, ··· |
| AUTUMN | 1, 12, 14, 25, 43, 44, 47, 53, 62, ··· |
| ⋮ | ⋮ |

| DATA NUMBER | WORDS INCLUDED IN THE DATA |
|---|---|
| 1 | AUTUMN,SKY,VILLAGE,BIRD,INSECT, ··· |
| 2 | TOWN,STREET,CROSSING,CAR, ··· |
| ⋮ | ⋮ |

…

RETRIEVAL APPARATUS

BACKGROUND OF THE INVENTION

The present invention relates to a retrieval apparatus which is applied for retrieval of information in a text database (e.g., electronic books or electronic dictionaries), video database (e.g., for photographic or video data) with an explanatory text or multimedia database (e.g., for multi-plexed text data).

Information retrieval in a text database has been widely realized by using a text-based retrieval method by searching for keywords. The method is such that a key word to be searched is keyed-in at a terminal and data including the key word is searched. For an image database, retrieval of a desired image stored therein may be conducted by searching for a keyword in an explanatory text attached to the image. However, information retrieval based on keywords may fail in obtaining matched information if a keyword is entered that is semantically analogous to but does not strictly match with a target one of words in the database.

On the other hand, semantics-based retrieval may be conducted by associative retrieval using feature vectors which are context vectors proposed in a paper entitled "Associative retrieval using a large-scale document database," TECHNICAL REPORT OF IEICE AI92-99 (1993-1) (THE INSTITUTE OF ELECTRONICS, INFORMATION AND COMMUNICATION ENGINEERS). Feature vectors used in a retrieval apparatus according to the present invention also correspond to the context vectors described above. A retrieval method using the feature vectors is disclosed in Japanese Laid-open Patent Publication (TOKKAI HEI) No. 6-195388.

The feature vector is indicative of a degree of relationship between a concept of each word in a text and a context. In other words, a degree of semantic connection between many feature words and each word in the text is expressed by vectors. If feature words are classified into N conceptual terms, each feature word corresponds to a value of each element of N-dimensional vectors. The feature vectors $Xi = (xi1, xi2, \ldots, xiN)$ of word <i> have element values xij which are not smaller than 0 and not larger than Em, i.e., $0 \leq xij \leq Em$ where Em is a positive constant value. The expression xij=0 indicates that there is no relation between the word <i> and the feature word <j>. Value varies depending on the extent of relationship between them. When a feature vector consists of five feature words, e.g., [nature, city, noise, animal, green] and respective element values take either of binary values 0 and 1, a feature vector of a word, e.g., "mountain" can be expressed as (1,0,0,1,1).

As shown in FIG. 1, there is a prior art retrieval apparatus using feature vectors. This retrieval apparatus comprises an input for inputting a request-text for retrieval, an output for outputting a result of retrieval, a control for controlling retrieval, a word dictionary and a database. The control is used for realizing functions of word extracting structure, vector generating structure and vector retrieving structure. The word dictionary contains records of words paired with corresponding feature vectors (hereinafter called [word vector]). The database holds records of data paired with corresponding feature vectors (hereinafter called [data vector]). The magnitude of a data vector is normalized to have a specified constant value.

In the retrieving apparatus, retrieval starts by entering a request-text to the apparatus through the input. The word extracting structure extracts words from the request-text input through the input referring to the word dictionary. The vector generating structure reads the word dictionary to find therein a word vector corresponding to the word extracted by the word extracting structure from the request-text and converts the request-text to vectors (hereinafter called [request-text vectors]) in a feature vector space. This conversion is realized by calculating a sum of word vectors of the words extracted by the word extracting structure and normalizing the obtained sum of the vectors to have a certain constant value. The vector retrieving structure calculates a distance between the request-text vectors and the data vectors in the database and the output outputs a retrieval result in the form of data arranged in the ascending order from the data having the shortest distance.

The above-mentioned retrieval method by using feature vectors, however, is based only on a distance between a request-text vector and a data vector and, therefore, can not always retrieve first data including words contained in the request-text as a keyword-retrieval method. This retrieval method can not retrieve data having a keyword or can not conduct semantic retrieval in parallel with searching a match with a keyword.

On the other hand, Japan Laid-open Patent Publication (TOKKAI HEI) No. 6-208588 discloses such a keyword-retrieval method which determines an importance degree of a keyword (depending upon parts of speech) by morphological analysis of a request-text and which allows a retrieval system to retrieve in the case that the request-text does not completely meet with the keyword in the database. This method, however, is based on keywords and, when retrieving a word or words separated in a request-text, can not retrieve data composed of only word or words that are semantically close to but not included in the request-text.

SUMMARY OF THE INVENTION

The present invention has as its object the provision of a retrieval apparatus which is capable of conducting both retrievals by using keyword and feature vector at a time, determining the order of possibility of the retrieval results according to successful combination of both retrievals and outputting improved retrieval results.

Another object of the present invention is to provide a retrieval apparatus, which includes an input for inputting a request-text for requesting retrieval of a target, a word dictionary for storing words together with corresponding word vectors, a database for storing data, each including at least a word, together with corresponding data vectors, word extracting structure for extracting a word in the request-text by using the word dictionary, vector generating structure for generating a request-text vector from the request-text by using the word dictionary and the word extracting structure, vector retrieving structure for determining semantic similarity of each of the data vectors to the request-text vector, key-word retrieving structure for retrieving the data including a word being common to that included in the request-text by using the word extracting structure and extended retrieving structure for retrieving data adapted to the request-text on the basis of the semantic analogy of data vectors to the request-text vector and the correspondence of the word in the data to the word in the request-text, which is detected by the keyword retrieving structure.

A further object of the present invention is to provide a retrieval apparatus, which includes an input for inputting a text requesting retrieval of a target, a word dictionary for storing words together with corresponding word vectors, a database for storing data including at least a word, word extracting structure for extracting a word in the request-text by using the word dictionary, vector generating structure for generating a request-text vector from the request-text by using the word dictionary and the word extracting structure and for generating a data vector from the data, vector retrieving structure for determining semantic similarity of each of the data vectors to the request vector, keyword retrieving structure for retrieving the data including a word being common to that included in the request-text by using the word extracting structure and extended retrieving structure for retrieving data adapted to the request-text on the basis of the semantic similarity of the data vector to the request-text vector and the correspondence of the word in the data to the word in the request-text, which is detected by the keyword retrieving structure.

A still further object of the present invention is to provide a retrieval apparatus which is constructed as described in above any one of the present invention and featured in that it is further provided with an index table for storing the correlation between data in the database and a word or words included in the data and the keyword retrieving structure retrieves the data including a word corresponding to that included in the request-text by using the index table in place of the word extracting structure.

PREFERRED EMBODIMENTS OF THE INVENTION

Prior to explaining preferred embodiments of the present invention, prior the previously-mentioned art retrieval apparatus will be described below as reference for the present invention.

Figure 1:
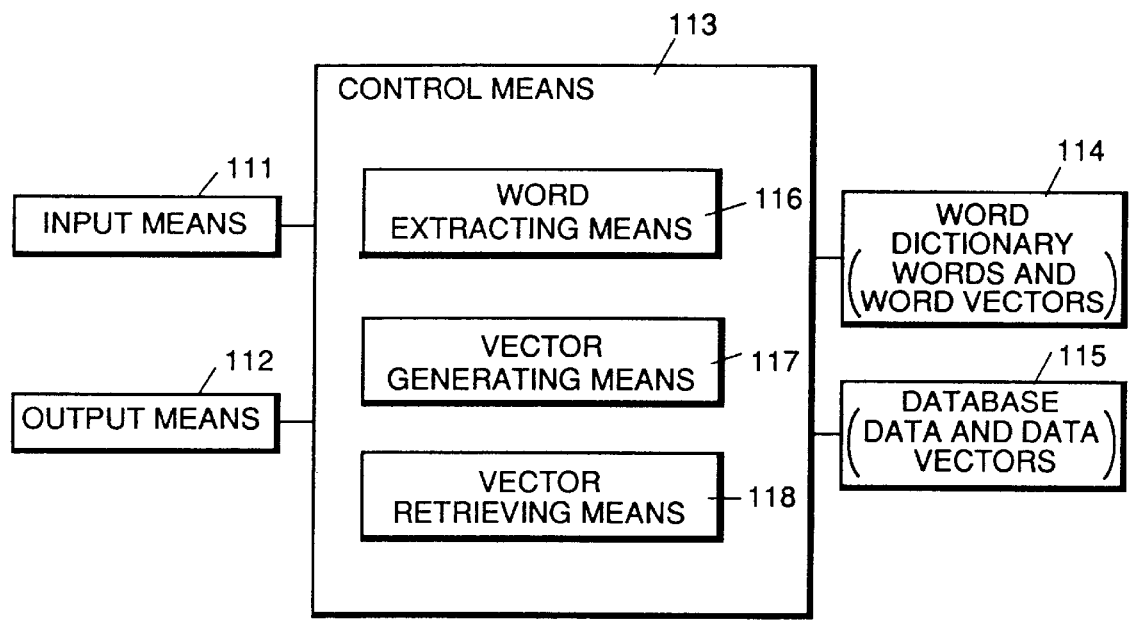
FIG. 1 is a construction block diagram of a prior art retrieval apparatus.

FIG. 1 is a schematic construction diagram of a prior art retrieval apparatus using feature vectors. This retrieval apparatus comprises input means 111 for inputting a request-text for retrieval, output means 112 for outputting a result of retrieval, control means 113 for controlling retrieval means, a word dictionary 114 and a database 115. The control means 113 is used for realizing functions of word extracting means 116, vector generating means 117 and vector retrieving means 118. The word dictionary 114 contains records of words paired with corresponding feature vectors. The database 115 holds records of data paired with corresponding feature vectors. A magnitude of a data vector is normalized to have a specified constant value.

In the retrieving apparatus, retrieval starts by entering a request-text to the apparatus through the input means 111. The word extracting means 116 extracts words from the request-text input through the input means 111 referring to the word dictionary 114. The vector generating means 117 reads the word dictionary 114 to find therein a word vector corresponding to the word extracted by the word extracting means 116 from the request-text and converts the request-text to vectors in a feature vector space. This conversion is realized by calculating a sum of word vectors of the words extracted by the word extracting means 116 and normalizing the obtained sum of the vectors to have a certain constant value. The vector retrieving means 118 calculates a distance between the request-text vectors and the data vectors in the database 115 and the output means 112 outputs a retrieval result in the form of data arranged in an ascending order from the data having the shortest distance.

Preferred embodiments of the present invention will be described below referring to the accompanying drawings.

Figures 2, 3, 4:
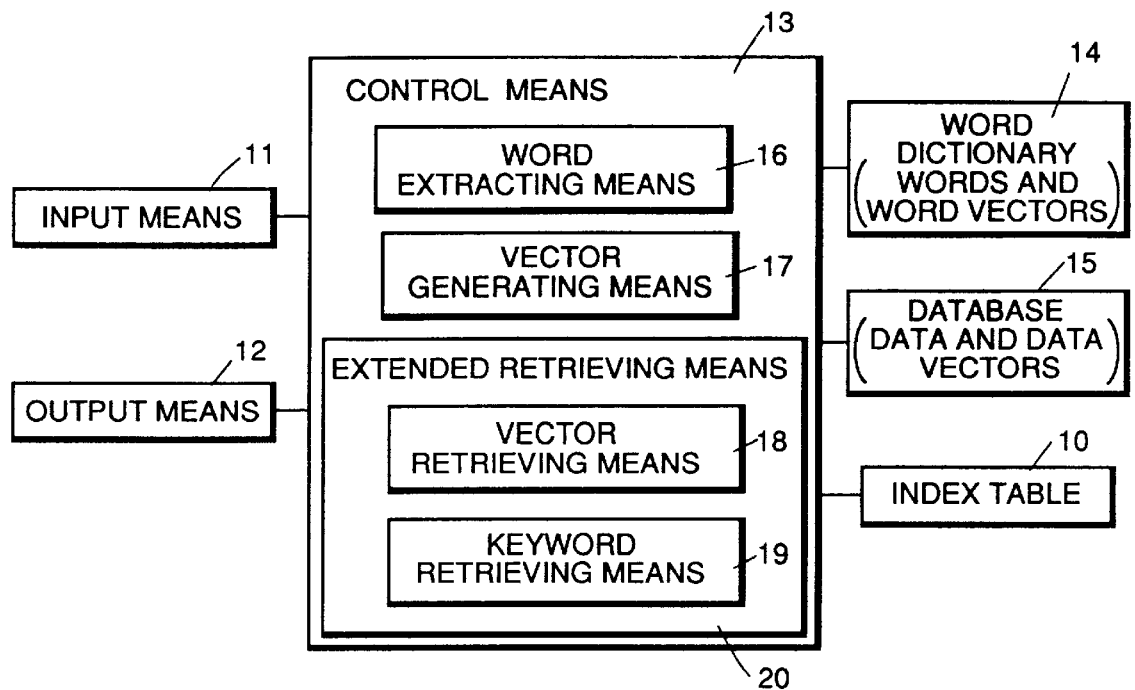
FIG. 2 is a construction block diagram of a retrieval apparatus embodying the present invention.
FIG. 3 shows an exemplified index table prepared for respective words.
FIG. 4 shows an exemplified index table prepared for respective data.

FIG. 2 shows a schematic construction diagram of a retrieval apparatus according to the present invention. This retrieval apparatus comprises input means 11 composed of, e.g., a keyboard for inputting a request-text for retrieval, a tablet for manually inputting a hand-written request-text and a microphone for inputting a retrieval-request by speech, output means 12 composed of, e.g., a display and/or a printer for outputting retrieval results according to obtained marks, control means 13 for controlling the retrieval operation according to a retrieval program, a word dictionary 14 containing words together with word vectors representing features of corresponding words, a database 15 containing data together with plural data vectors representing data features of corresponding data and an index table 10 storing relations between data included in the database and words included in the data. The control means 13, the word dictionary 14, database 15 and the index table 10 are included in a computer system composed of a CPU, an internal memory and an external storage.

This retrieval apparatus performs the operations (to be described later in detail) according to the retrieval program stored in a storage medium and to be loaded on a memory of the control means 13. The control means 13 provides the functions of word extracting means 16 for extracting words from a request-text or data for retrieval, vector generating means 17 for generating a request-text vector from the request-text and extended retrieving means 20 for executing the retrieval operations according to the present invention. The extended retrieving means 20 is provided with vector retrieving means 18 for executing retrieval by using feature vectors and keyword retrieving means 19 for executing retrieval by using a keyword.

Data in the database 15 may be such data as text data, image data (photographs or video) with an explanatory text, speech data with description by speech or a combination of the above-mentioned data. Each data must contain at least a word in its part. Each data vector value is normalized so that it can be made equal to a specified value. In this example, each vector value is determined by extracting a root of a sum of vector element squares and normalized to be equal to 10. The data vectors are determined in advance by using the word dictionary 14 and stored in the storage means. This eliminates the need for generating data vectors from the database 15 every retrieval, thus realizing high-speed retrieval. The data vectors may not necessarily be stored in the database 15. The data vectors may be stored in a storage (not shown) connected with the control means 13 if they are clearly corresponded with to respective data in the database 15. It is also possible to generate data vectors from text data in the database 15 every retrieval by the vector generating means 17 to save the memory capacity of the database 15.

The operation of the retrieval apparatus is as follows:

Retrieval starts with an input of a request-text for retrieval through the input means 11. The word extracting means 16 extracts words from the request-text inputted through the input means 11 with reference to the word dictionary 14. The vector generating means 17 reads the word dictionary 14 to find vectors of words corresponding to the words extracted from the request-text by the word extracting means 16 and converts the inputted request-text to request-text vectors. This conversion is made by determining a sum of extracted word vectors and normalizing the sum of extracted word vectors to be equal to a specified value. In this instance, the magnitude of the request-text vector is normalized so that it can be made equal to 10.

The vector retrieving means 18 calculates a distance between the request-text vector and data vectors corresponding to respective data in the database 15. In this instance, a distance is calculated by an inner product of two vectors. Since values of both request-text vector and data vector are normalized to be of 10, the shortest distance is expressed by an inner-product value of 100 and the largest distance is expressed by an inner product of 0. Namely, an inner product value of two vectors lies in the range of 0 to 100. The larger inner-product value has the shorter distance between two vectors, i.e., a semantically closer relation exists between them. Each data is marked with an inner-product value of its vector by the request-text vector. For example, it is supposed that a feature vector is five-dimensional, a request-text vector V is expressed as V=(3, 4, 7, 5, 1) and data vector U is represented as U=(1, 5, 3, 8, 1). An inner product value P of two vectors is determined as follows:

$$P=(3\times1)+(4\times5)+(7\times3)+(5\times8)+(1\times1)=85$$

Namely, the data obtains a mark of 85 relative to the request-text.

The keyword retrieving means 19 searches in the database 15 to find data that contains a word extracted by the word extracting means 16 from an inputted request-text. The word extracting means 16 extracts a word from each data in the database 15. Data that contains even one word matching with one of the words contained in the request-text is output as a result of retrieval. When, for example, words "Sky", "Autumn", "West" and "City" were extracted from a request-text "Sky in autumn over the west of the City", all data which contain at least one of the above-listed words "Sky", "Autumn", "West" and "City" are retrieved and output.

In keyword retrieving by the keyword retrieving means 19, the use of the index table 10 holding therein words contained in the database 15 may realize higher speed retrieval since this eliminates the need for extracting words from each data in the database 15 by using word extracting means 16 every time of retrieval. Each data in the database 15 is given a serial data number. The index table 10 holds each word together with a number of data including the word or a data number together with words contained therein. The former type index table is shown in FIG. 3 and the latter type index table is shown in FIG. 4.

The extended retrieving means 20 gives marks to respective data according to the results of both retrievals made by the vector retrieving means 18 and the keyword retrieving means 19. For vector retrieval by the vector retrieving means 18, each data is given a mark in a range from 0 to 100 depending upon semantic similarity to the request-text. For keyword retrieval by the keyword retrieving means 19, data containing the same words that are contained in the request-text is retrieved and estimated with a mark to be determined as follows:

(Mark)=(the number of matched words)/(the number of words in the request-text)×100

Any word that appears two times or more in the data or the request-text is considered to exist only one time herein. The data searched by keyword retrieval can be thus estimated with a mark within 0 to 100. Namely, data containing all the same words that the request-text contains is given a mark of 100 while data that does not contain any word contained in the request-text is given a mark of 0.

When, for example, words "Sky", "Autumn", "West" and "City" were extracted from a request-text "Sky in autumn over the west of the City" and words "City" and "Town" were extracted from data containing a phrase "a town in the city", the data has the word "City" being common to that in the request-text is estimated with a mark S:

$$S=\frac{1}{4}\times100=25$$

This data is given a mark of 25.

After calculation of marks P (inner product value) and S for every data concerned, the extended retrieving means 20 determines a sum of marks P and S for each data and outputs a set of data according to the marks as a retrieval result to the output means 12. The retrieval result may be outputted with total marks, marks P and marks S.

The total mark St is calculated, for example, according to the following equation:

$$St=P+(\alpha\times S)$$

where $\alpha$ is a real value larger than 0. This enables weighting values for vector retrieval and keyword retrieval to vary relative to each other. When $\alpha=1$, marks P and S are added together in relation 1:1, i.e., data is given a total mark of a specified value in the range of 0 to 200. When data obtained a mark of 85 as a vector retrieval result and a mark of 25 as a keyword retrieval result, it is evaluated with a total mark of 110. With $\alpha=0$, data is equivalent to the result evaluated by a vector retrieval. With $\alpha>1$, data is equivalent to the result evaluated by a keyword retrieval.

Value $\alpha$ may be set by a user according to retrieval results output by the output means 12 or may be automatically set according to total marks of vector and keyword retrieval results of data to the specified order, for instance, so that the total mark of the vector retrieval and the total mark of the keyword retrieval can be made even to each other. By thus adjusting the value $\alpha$, it is possible to adjust the degree of the vector retrieval and the degree of the keyword retrieval. A combination of both kinds of retrieval results can compensate their deficiencies and improve the quality of retrieval results.

According to the present invention, it is possible to provide a retrieval system to obtain an improved result of retrieval by combining keyword retrieval with vector retrieval.

What is claimed is:

1. A retrieval apparatus comprising:

input means for inputting a request-text for retrieval;

a word dictionary containing words together with corresponding word vectors;

a database for storing data, each including at least a word, together with corresponding data vectors;

word extracting means for extracting a word in the request-text by using the word dictionary;

vector generating means for generating a request-text vector from the request-text by using the word dictionary and the word extracting means;

vector retrieving means for determining a semantic similarity of each of the data vectors to the request-text vector;

key-word retrieving means for searching the data including a word being common to that included in the request-text by using the word extracting means; and extended retrieving means for retrieving data adapted to the request-text on the basis of the semantic similarity of data vector to the request-text vector and the correspondence of the word in the data being searched by the keyword retrieving means to the extracted word in the request-text.

2. A retrieval apparatus comprising:

inputting means for inputting a request-text to be retrieved;

a word dictionary containing words together with corresponding word vectors;

a database containing data including at least a word;

word extracting means for extracting a word in the request-text by using the word dictionary;

vector generating means for generating a request-text vector from the request-text by using the word dictionary and the word extracting means and for generating a data vectors from the data;

vector retrieving means for determining a semantic similarity of each of the data vectors to the request-text vector;

key-word retrieving means for searching the data including a word being common to that included in the request-text by using the word extracting means; and extended retrieving means for retrieving data adapted to the request-text on the basis of the semantic similarity of data vector to the request-text vector and the correspondence of the word in the data being searched by the keyword retrieving means to the extracted word in the request-text.

3. A retrieval apparatus as defined in claim 1, wherein it is further provided with an index table for storing a correlation between data in the database and a word included in the data and the keyword retrieving means searches the data including a word being common to that included in the request-text by using the index table in place of the word extracting means.

4. A retrieval apparatus as defined in claim 2, wherein it is further provided with an index table for storing a correlation between data in the database and a word included in the data and the keyword retrieving means searches the data including a word being common to that included in the request-text by using the index table in place of the word extracting means.

5. A retrieval apparatus comprising:

a control processor;

an input communicating with the control processor, the input inputting a request-text for retrieval;

a word dictionary communicating with the control processor, the word dictionary containing words together with corresponding word vectors; and a database communicating with the control processor, the database storing data including at least a word, together with corresponding data vectors, wherein the control processor comprises:

a word extracting unit that extracts a word in the request-text by using the word dictionary, a vector generating unit that generates a request-text vector from the request-text by using the word dictionary and the word extracting unit, a vector retrieving unit that determines a semantic similarity of each of the data vectors to the request-text vector, a key-word retrieving unit that searches the data including a word being common to that included in the request-text by using the word extracting unit, and an extended retrieving unit that retrieves data adapted to the request-text on the basis of the semantic similarity of data vector to the request-text vector and the correspondence of the word in the data being searched by the keyword retrieving unit to the extracted word in the request-text.

6. A retrieval apparatus as defined in claim 5, wherein the extended retrieving unit utilizes a weighting value for retrieving the data adapted to the request-text on the basis of the semantic similarity of the data vector to the request-text vector and the correspondence of the word in the data being searched by the keyword retrieving unit to the extracted word in the request-text.

7. A retrieval apparatus comprising:

an input effecting input of a request-text to be retrieved;

a word dictionary containing words together with corresponding word vectors;

a database containing data including at least a word;

a word extracting unit that extracts a word in the request-text by using the word dictionary;

a vector generating unit that generates a request-text vector from the request-text by using the word dictionary and the word extracting unit, the vector generating unit generating data vectors from the data;

a vector retrieving unit that determines a semantic similarity of each of the data vectors to the request-text vector;

a key-word retrieving unit that searches the data including a word being common to that included in the request-text by using the word extracting unit; and an extended retrieving unit that assigns marks to respective data according to results from the vector retrieving unit and the key-word retrieving unit, respectively, wherein the extended retrieving unit determines a sum of marks for each data and outputs a set of data according to the marks as a retrieval result, wherein a user designated weighting value is applied to the retrieval result to adjust a degree of vector retrieval and a degree of key word retrieval.

8. A retrieval apparatus comprising:

an input effecting input of a request-text to be retrieved;

a word dictionary containing words together with corresponding word vectors;

a database containing data including at least a word;

a word extracting unit that extracts a word in the request-text by using the word dictionary;

a vector generating unit that generates a request-text vector from the request-text by using the word dictionary and the word extracting unit, the vector generating unit generating data vectors from the data;

a vector retrieving unit that determines a semantic similarity of each of the data vectors to the request-text vector;

a key-word retrieving unit that searches the data including a word being common to that included in the request-text by using the word extracting unit; and an extended retrieving unit that combines a retrieval result extracted by the vector retrieving unit and a retrieval result extracted by the key-word retrieving unit on the basis of the symantic similarity of data vector to the request-text vector and the correspondence of the word in the data being searched by the key word retrieving unit to the extracted word in the request-text.

9. A retrieval apparatus comprising:

a control processor;

an input communicating with the control processor, the input inputting a request-text for retrieval;

a word dictionary communicating with the control processor, the word dictionary containing words together with corresponding word vectors; and a database communicating with the control processor, the database storing data including at least a word, together with corresponding data vectors, wherein the control processor comprises:
- a word extracting unit that extracts a word in the request-text by using the word dictionary,
- a vector generating unit that generates a request-text vector from the request-text by using the word dictionary and the word extracting unit,
- a vector retrieving unit that determines a semantic similarity of each of the data vectors to the request-text vector,
- a key-word retrieving unit that searches the data including a word being common to that included in the request-text by using the word extracting unit, and an extended retrieving unit that combines a retrieval result extracted by the vector retrieving unit and a retrieval result extracted by the key-word retrieving unit on the basis of the symantic similarity of data vector to the request-text vector and the correspondence of the word in the data being searched by the key word retrieving unit to the extracted word in the request-text.

* * * * *